J. A. STEINMETZ.
CAPTURING OR DESTROYING AIRCRAFT.
APPLICATION FILED MAY 7, 1914.
1,171,152.                                    Patented Feb. 8, 1916.
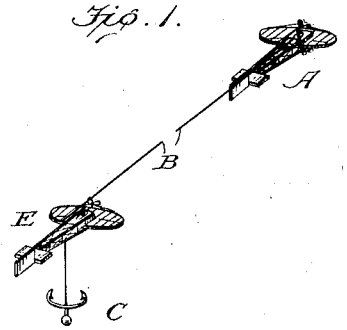
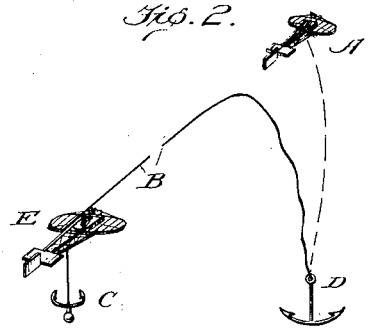
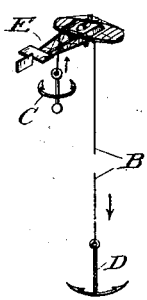
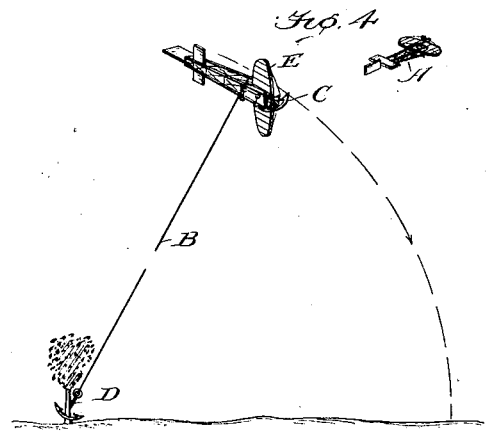
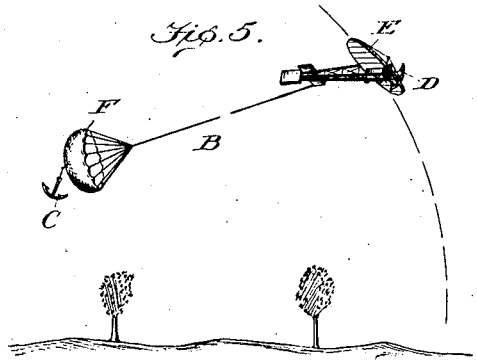
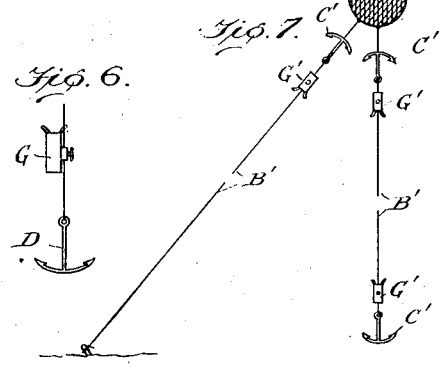
WITNESSES:
James L. Crawford
Robert Craig Greene.
INVENTOR
Joseph A. Steinmetz
BY
Wallace Lrune,
ATTORNEY.

UNITED STATES PATENT OFFICE.

JOSEPH A. STEINMETZ, OF PHILADELPHIA, PENNSYLVANIA.

CAPTURING OR DESTROYING AIRCRAFT.

1,171,152. Specification of Letters Patent. Patented Feb. 8, 1916.

Application filed May 7, 1914. Serial No. 836,892.

*To all whom it may concern:*

Be it known that I, JOSEPH A. STEINMETZ, a citizen of the United States, residing at Philadelphia, in the county of Philadelphia and State of Pennsylvania, have invented certain new and useful Improvements in Capturing or Destroying Aircraft, of which the following is a specification, reference being had therein to the accompanying drawing.

A leading object of this invention is to capture hostile aircraft although it also provides optionally usable means for destroying them. This leading object is sought in providing means for quickly attaching some part of such aircraft to the earth or to a drag, thereby exerting a disabling or descent-compelling pull upon the attacked object.

In the accompanying drawings, which are diagrammatic, Figure 1 shows in perspective, an attacked and an attacking aeroplane in flight, the latter being provided with my devices. Figs. 2, 3, 4, show successive later stages of the attack. Fig. 5 shows, similarly, a modified device secured to the attacked aircraft by the attacking aeroplane, which is omitted in this figure. Fig. 6 shows a bomb attached to a part of the apparatus carried by the attacking aircraft. Fig. 7 shows a modified arrangement involving both the capturing devices and destroying bombs.

In these figures, A represents an attacking aeroplane, or other suitable aircraft, provided with a preferably very long flexible cable or wire B having at one end a suitable grapple C and at the other a preferably much heavier anchor D. The attacking aeroplane rises, or seeks to rise, far above the plane of an aircraft E which it is desired to capture or destroy, and when at proper height drops the grapple and pays out enough wire to hold the grapple suspended at some distance below that plane, and then by taking a suitable course seeks to bring the suspending wire laterally against the lower aircraft. When the attacking aviator finds the grapple and the two vessels in suitable relative position, he drops the anchor, as suggested in Fig. 2, and continues his flight in any desired direction. If he has judged correctly, the grapple and anchor quickly descend and the intermediate portion of the wire forms a bight or loop in which the attacked craft is caught, as indicated in Fig. 3, and then owing to the excess of weight the anchor quickly drops to the earth, the wire slipping on the attacked aircraft, meantime, and the grapple being drawn upward into engagement with the latter. The anchor engaging the earth or objects thereon, the moving attacked craft is instantly subjected to a rotary and descent-compelling pull quickly bringing it to earth. Owing to the movement of the attacked craft, slack in the wire when the anchor reaches the earth is at once taken up and the result is unchanged. Should it happen that the attacked craft is engaged by the grapple before the anchor reaches the earth, the heavy anchor exerts a strong and instantaneous pull usually tending to rotate the attacked craft, and if the grapple holds its engagement the latter is brought down, while if the grapple should tear loose there is a strong probability that the attacked craft will be disabled.

In some cases it may be advisable to modify the construction and action of the devices, and a parachute F, Fig. 5, is provided. This may be quickly attached to the wire near the grapple, before or after the latter is thrown overboard, and at the proper time the anchor is dropped as before but without paying out enough wire necessarily, to reach the earth. If the attacked craft is in the usual rapid flight, the parachute strongly resists forward movement and the anchor itself is thus drawn upward into engagement with the attacked craft, which the parachute acting as a drag compels to descend so that again it may be put out of commission without necessarily being destroyed.

Should the attacking aviator so desire, he may quickly clamp to the wire near the grapple or anchor or elsewhere a bomb G, Fig. 6, adapted to explode whenever it is drawn against the attacked craft, by the attacking craft, by the anchor, or by the pull of the parachute, and thereby the attacked craft may be utterly destroyed by an explosion occurring when the attacking craft is at a safe distance.

Another embodiment of the same general ideas involves using a small captive balloon H, a box kite, or the like, and suspending therefrom, by a wire B', a grapple C', and if desired a bomb G', as shown in Fig. 7. Preferably, a second oppositely turned grapple and bomb if desired, are also attached to the wire B' near the balloon and also to the wire I holding the balloon captive, so that lateral deflection of either wire by any moving aircraft will cause such craft to be engaged by one at least of the grapples or to be destroyed by explosion of one or more of the bombs. It may be here mentioned that, as in certain patented devices in this general art, the bombs, when used, are provided with a weight at the end opposite the contact devices, so that in case of falling to the earth the impact may be that of the weighted end rather than the contact bearing end.

For defending definite places, especially at night or in a thick fog, when guns and searchlights (heretofore the only reliance) are practically useless, the apparatus of Fig. 7 is of great importance.

The cost of a thousand of these devices is but a small fraction of the cost of a single battleship, for example, and when a large number of such devices are properly distributed about a city, fort, or canal, for example, attack by airships seeking to drop high explosives, perhaps, under cover of darkness or thick fog, is practically guarded against.

It is desirable to have the grappling devices provided with sharp points adapted to pierce puncturable envelops, wings and the like, and with barbs which tend to maintain engagement with fabric, wires, or other parts of hostile craft. Where aeroplanes or any aircraft in free flight are used, the wire is preferably carried upon suitable reels, as in the prior art, and in such cases the wire is paid out so far as may be desired and then the aviator clamps to the wire an anchor, or bomb, or both, and then cuts the wire between them and the reel, before the attached devices are thrown overboard.

As one of the many advantages of the use of this invention, it may be noted that in the chances of warfare, the aviator may find that his distance from the point of an explosion which he is about to cause will be dangerously short. In such case, instead of allowing his own craft to pull a bomb into explosive contact, he clamps an anchor or weight to the wire and cuts the latter, immediately dropping the attached devices and moving out of the zone of danger in the brief interval before the explosion. It is also plain that while the apparatus is especially intended for aerial warfare, it may be used in attacking objects on land or water as well as those in the air.

What I claim is:

1. The method of attacking hostile aircraft which consists in suspending a grapple, in a plane below such aircraft, by means of a wire or the like from another aircraft in a higher plane, securing to the wire at the higher aircraft a weight heavier than the grapple, bringing the vertical lines through the grapple and weight upon opposite sides of the lower craft, and throwing the weight free from the higher craft.

2. The method of attacking aircraft in flight which consists in providing a long wire, or the like, having at one end a contact bomb and at the opposite end a weight materially heavier than the bomb, and by suitable means causing the intermediate portion of the wire to rest upon an attacked aircraft lying between the otherwise unsupported weight and bomb; whereby the weight descending by gravity draws the lighter bomb into contact with the attacked aircraft and thus causes an explosion.

3. The combination with a suitable aircraft, of a wire depending therefrom and having at its lower end a bomb adapted to explode when drawn upwardly against a resisting body, and having at its upper end a weight materially heavier than the bomb; whereby the bomb and weight being brought to opposite sides of any attacked aircraft in a lower plane, the discharge of the weight may cause the bomb to be drawn to the attacked aircraft.

In testimony whereof I affix my signature in presence of two witnesses.

JOSEPH A. STEINMETZ.

Witnesses:
E. M. CONREY,
H. G. VAN COURT.